(12) United States Patent
Matti et al.

(10) Patent No.: US 8,582,553 B2
(45) Date of Patent: Nov. 12, 2013

(54) POLICY MANAGEMENT IN A ROAMING OR HANDOVER SCENARIO IN AN IP NETWORK

(75) Inventors: Mona Matti, Nacka (SE); Tony Larsson, Upplands Väsby (SE); Tor Kvernvik, Täby (SE); Mattias Lidström, Stockholm (SE); Niklas Björk, Järfälla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 904 days.

(21) Appl. No.: 12/376,414

(22) PCT Filed: Jun. 14, 2007

(86) PCT No.: PCT/SE2007/050417
§ 371 (c)(1),
(2), (4) Date: Feb. 4, 2009

(87) PCT Pub. No.: WO2008/016324
PCT Pub. Date: Feb. 7, 2008

(65) Prior Publication Data
US 2010/0169950 A1   Jul. 1, 2010

(30) Foreign Application Priority Data

Aug. 4, 2006 (SE) ...................................... 0601647

(51) Int. Cl.
*H04L 12/28* (2006.01)
(52) U.S. Cl.
USPC ........ 370/351; 370/386; 370/395.3; 455/436; 455/435.2; 455/345.1; 455/432.1
(58) Field of Classification Search
None
See application file for complete search history.

(56) References Cited

U.S. PATENT DOCUMENTS 7,242,932 B2 *   7/2007   Wheeler et al. ............ 455/435.1
(Continued)

FOREIGN PATENT DOCUMENTS

WO    WO 2006/000612 A     1/2006

OTHER PUBLICATIONS

Digital Cellular Telecommunications System (Phase 2+) ; Universal Mobil Telecommunications System (UMTS) ; IP Multimedia Subsystem (IMS); Stage 2 (3GPP TS 23.228 version 5.15.0 Release 5) ; ETSI TS 123 228 ETSI Standards, European Telecommunications Standards Institute, Sophia-Anti PO, FR, vol. 3-SA2, No. V5150, Jun. 2006, XP014035468.

(Continued)

*Primary Examiner* — Rafael Pérez-Gutiérrez
*Assistant Examiner* — Keith Fang

(57) ABSTRACT

The invention comprises methods and arrangements for Policy Decision Point discovery in a roaming or handover scenario in an IP network (IN) comprising a plurality of network elements. The invention comprises methods and arrangement in an user equipment for receiving the address of the serving policy decision point and sending to the Home Agent a registration request comprising the local IP address of the user equipment so that the home agent can register the local IP address. The registration request will also comprise the address (ASPDP1) of the serving policy decision point (SPDP1) so that the Home Agent can forward the address of the serving policy decision point to the anchor Policy Decision Point and so that the anchor Policy Decision Point can contact the serving policy decision point by using said address of the serving Policy Decision Point.

2 Claims, 3 Drawing Sheets

(56) References Cited

U.S. PATENT DOCUMENTS

| | | | |
|---|---|---|---|
| 7,840,217 B2* | 11/2010 | Patel et al. | 370/331 |
| 2002/0075844 A1* | 6/2002 | Hagen | 370/351 |
| 2006/0056351 A1* | 3/2006 | Wall | 370/331 |
| 2007/0094709 A1* | 4/2007 | Hsu | 726/2 |
| 2012/0057502 A1* | 3/2012 | O'Neill | 370/254 |

OTHER PUBLICATIONS

"TR 23.882, 3GPP system architecture evolution: Report on Technical Options and Conclusions, Release 7" 3rd Generation Partnership Project (3GPP); Technical Report (TR), XX, XX, vol. 23.882, No. V123, Jun. 15, 2006, pp. 1-127, XP002414829.

* cited by examiner

POLICY MANAGEMENT IN A ROAMING OR HANDOVER SCENARIO IN AN IP NETWORK

TECHNICAL FIELD

The present invention relates to policy management in an IP network. In more detail it relates to policy management in the case of roaming and handover between two Policy Enforcement Points controlled by two different Policy Decision Points.

BACKGROUND

Policy management in an IP network is an important function as the policies indicate essential conditions for the users in the network.

An example of an IP network is IP Multimedia Subsystem (IMS). IMS has been developed by the $3^{rd}$ Generation Partnership Project (3GPP) as an open standard, to give operators of access networks the ability to offer multimedia services in the packet domain. An IMS network can be built above any type of access network and is more or less independent of the access technology used. By using IMS, telecommunications operators can provide services to users irrespective of their location, access technology, and terminal. It also includes a handover of calls between fixed-line and mobile networks.

An important function of IP networks is the enforcement of different policies. These policies dictate e.g. what particular users may and may not do, what they will be charged or what Quality of Service (QoS) a particular user will receive for a specific service. Policies are enforced using policy "rules". A single policy may require a set of policy rules. Policy rules are installed into a node through which all traffic of the users pass or into multiple nodes, which collectively handle all traffic of the user. Common functions in a policy management system are a Policy Enforcement Point (PEP), a Policy Decision Point (PDP) and a subscriber database comprising subscriber/subscription related information.

In 3GPP the PDP functions are handled by the Policy and charging Rules Function (PCRF), the PEP functions are handled by the PCEF located in the GGSN and the subscriber database functions are handled by the Subscription Profile Repository (SPR).

For large IP networks it is common to have several PEPs and several PDPs. Each operator has normally at least one subscriber database for their users. An important function in a case of an IP network is the possibility of roaming and handover between different access points and access networks. Roaming occurs when a user of one service provider or operator uses the facilities of another service provider or operator. Handover normally means the transfer of an ongoing call or data session from one channel connected to the network to another.

From a policy management point of view a Mobile Terminal access the IP network via a PEP which is associated to a specific PDP, which controls the PEP.

For e.g. reasons of scalability, each operator could have several PDP in his network. It is also possible that an operator has a specific PDP for a certain access, e.g. one PDP for 3GPP access and another one for WiMAx access. If a visited network or a home network comprises several PDPs there is no solution today that can handle the policy management in roaming and handover between different PEPs.

In 3GPP R7 a mobile terminal accesses the IP network via a PCEF, a PEP, and the IP address of the subscriber will be associated to a PCRF, a PDP, which controls to the PCEF. If the IP Connectivity Access Network (IP-CAN) is GPRS the appropriate PCRF could be contacted based on which Access Point Name (APN) the mobile terminal is connected to. It is also possible to use the IP address to choose the appropriate PCRF.

For other IP-CANs the Gateway shall contact the appropriate PCRF based on the access point the mobile terminal is connected to and, optionally, a mobile terminal identity information that is applicable for that IP-CAN. In the case of GPRS the mapping from a certain user equipment identity and/or access point name to the PCRF is typically stored in pre-configured tables in the GGSN, the PCEF and the AF.

If there is a plurality of PCRFs in a network the policy management will not work properly. If the mobile terminal has the possibility to access the network via different access points and access networks controlled by different PDPs, different nodes associated to the mobile terminal does not know which PDP that controls the policy management of a mobile terminal.

Other architectures have similar functions as the PCRF, e.g. TISPAN, WiMax Forum, DSL Forum and PacketCable. They also have similar solutions to associate an end-user to a specific PDP.

SUMMARY

To make it possible for the policy management to work in an IP network comprising a plurality of Policy Decision Points (PDP) the network needs to set up connection between some of the policy management functions.

A method and arrangement in an user equipment for Policy Decision Point discovery in a roaming or handover scenario in an IP network (IN). The IP network comprises a user equipment (UE) assigned a local IP address and an home IP address, a plurality of Policy Enforcement Points (APEP, SPEP1, SPEP2) including a serving Policy Enforcement Point (SPEP1) associated to the user equipment, a plurality of Policy Decision Points (APDP, SPDP1, SPDP2) including a serving Policy Decision Point (SPDP1) associated to the user equipment and the serving Policy Enforcement Point (SPEP1), and an anchor Policy Decision Point associated to the user equipment. The anchor Policy Decision Point has access to both Policy Rules and a subscriber database (120) comprising policy information related to the user equipment. The network also comprises an Home Agent (HA) associated to the user equipment.

The invention comprises methods and arrangement in an user equipment for receiving the address of the serving policy decision point and sending to the Home Agent a registration request comprising the local IP address of the user equipment so that the home agent can register the local IP address. The registration request will also comprise the address (ASPDP1) of the serving policy decision point (SPDP1) so that the Home Agent can forward the address of the serving policy decision point to the anchor Policy Decision Point and so that the anchor Policy Decision Point can contact the serving policy decision point by using said address of the serving Policy Decision Point.

An advantage with this invention is that it makes it possible to support handover and roaming scenarios between Policy Enforcement Points in a network comprising a plurality of Policy Decision Points.

The invention will now be described more in detail with the aid of preferred embodiments in connection with the enclosed drawings.

DETAILED DESCRIPTION

Figure 1:
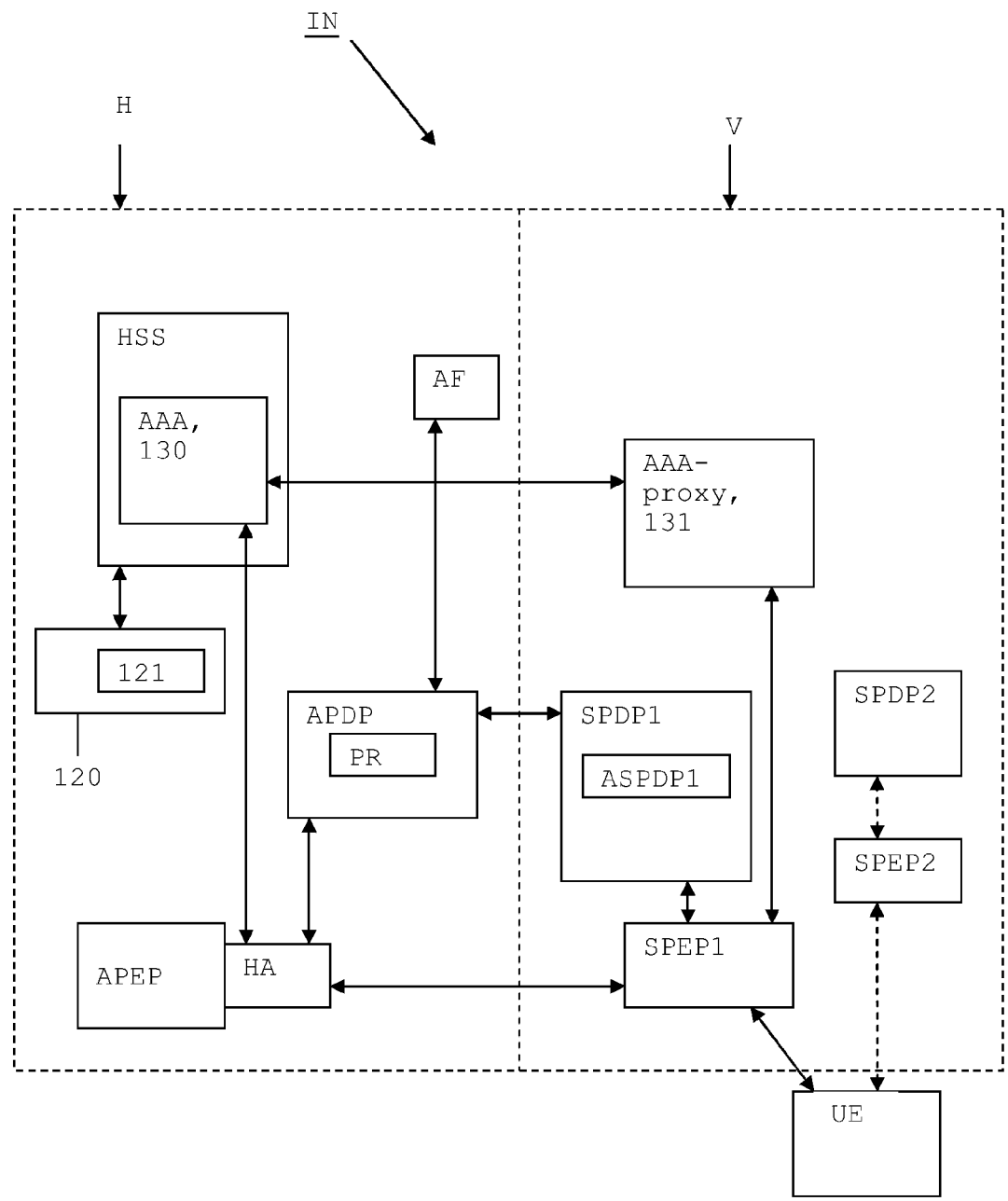
FIG. 1 is a block diagram to illustrate one embodiment of the invention in a roaming scenario.

FIG. 1 illustrates an IP network IN comprising a User Equipment UE, a subscriber database 120 comprising policy related subscriber data 121, policy rules PR, an Anchor Policy Decision Point APDP, Serving Policy Decision Points SPDP1, SPDP2, an Anchor Policy Enforcement Point APEP, Serving Policy Enforcement Points SPEP1, SPEP2, an application function AF, an AAA server AAA, an AAA proxy 131 and a Home Agent HA. The address of the Serving Policy Decision Point SPDP1 is ASPDP1. A user equipment UE is attached to the network. The AAA server can be integrated with the HSS server.

A Policy Enforcement Point (PEP) is a function that requests for access to a resource or execution of a service. The PEP requests evaluation of these access/service execution requests to a Policy Decision Point (PDP). The PDP returns its decision to the PEP and the PEP enforces/carries out the decision that is returned by the PDP. The PEP could e.g. block certain types of traffic according to the decision of the PDP or grant access to specific services.

The main task of a Policy Decision Point (PDP) is to evaluate requests addressed to the PEP. It evaluates the request against a policy. The outcome of the policy evaluation is the 'decision' of the PDP. The PDP and the PEP may be implemented as two distinct entities that intercommunicate by means of a protocol.

An example of a PEP and the PDP is the Policy and Charging Rules Enforcement Function (PCEF) and the Policy and Charging Rules Function (PCRF) in 3GPP PCC R7. Critical traffic, e.g. voice, will be controlled by the PCRF.

An Anchor PDP controls the PEP from a policy management point of view and has access to Policy Rules PR and specific policy information for the Mobile Terminal, the Policy related Subscriber Data 121. A Serving PDP is the one that controls the PEP that the mobile terminal is connected to. These PDPs could be situated everywhere in the network, e.g. in the access network, core network or service network.

The Policy Rules could be stored everywhere, e.g. in the different PDPs or in a separate policy database. In this particular embodiment they are stored in the Anchor PDP.

Policy related subscriber data 121, e.g. subscriber class or subscriber services, for a particular user/subscriber 110 are stored in the subscriber database 120. The subscriber database is normally located in the Home network H. Protocol used between the subscriber database and a PDP could be e.g. LDAP. An example of a subscriber database is the Subscription Profile Repository in 3GPP R7.

The Application Function AF is an element offering applications that require the control of IP bearer resources. The Application Function is capable of communicating with the PDP to transfer dynamic service information, which can then be used for selecting the appropriate charging rule and service based local policy by the PDP. One example of an Application Function is the P-CSCF of the IM CN subsystem.

The home agent HA keeps among other things information about LO the current IP address of the user equipment. A mobile user equipment that attaches to the network will be assigned a local IP address. This address will be registered at the home agent. In MIPv6 this is done in the message binding update from the user equipment to the home agent. In MIPv4 the corresponding message is called registration request.

The AAA function refers to protocols and supporting infrastructure for authentication, authorization and accounting (AAA) in IP networks. The purpose of AAA is to verify the identity of the user (authentication), to verify what types of service the user is entitled to (authorization) and to collect data necessary for billing the user for the service (accounting).

If a mobile user accesses the network via another PEP than the Anchor PEP, e.g. a Serving PEP, SPEP1 in a visiting network, the user is going to be associated to Serving PDP SPDP1, that controls the SPEP1. In this example he attaches to SPEP1 and the SPDP1 assigned.

To be able to enforce the proper policy decisions the SPDP1 and the APDP must communicate with each other. Preferably the APDP discover the SPDP1 and initiate the PDP-PDP interaction. This could be done via the interface S9 mentioned in 3GPP TS 23.203 and TR 23.882. To be able to set up a connection the invention proposes that one of the Policy Decision Points, SPDP1 or APDP, receives the address of the other one. To be able to do this, the invention introduces a method to deliver the address (ASPDP1) of the serving policy decision point to the anchor policy decision point. The method comprises the feature of including this address in the communication in the IP mobility procedure of the user equipment.

A first embodiment describes a roaming scenario according to FIG. 1. In a first embodiment the Anchor PDP is situated in the Home operator network H and the Serving PDP, SPDP1, is situated in a visited network V. The Anchor PDP is also connected to an Application Function (AF) situated in the Home network H. The home agent HA is situated in the home network H and the user equipment is connecting to a Policy Enforcement Point, SPEP1, in the visiting network V. An AAA server is integrated with the HSS server. There is an AAA proxy in the visited network. The method comprises the following steps.

The user equipment UE attaches to the visited network.
Run an access authentication procedure.
Assign an home agent(HA)
Run DHCP discovery for assignment of the local IP address to the UE.
Configure the UE with the address (ASPDP1) of the SPDP depending on the assigned IP address.
IP session request is send to S-PDP
Run IP security between UE and the AAA server, via the AAA proxy, assign an home agent PoP (HA) and include the HA in the successful response of the IP security.
HA assigns a home IP-address of the UE and an anchor policy decision point APDP.
APEP, including the HA, sends IP session setup to the APDP.
UE starts MIP binding update or registration request to the HA including the S-PDP address.
HA sends update request to A-PDP including the S-PDP address.
The APDP creates a default PCC rule after interaction with the subscriber database 120, initiates a PDP-PDP interface to push rules to the SPDP1.
The SPDP1 push rules after possible modification to the SPEP1. The session ID can be used to bind local IP address and the home IP address in APDP.

The nodes and functions can be situated in all kind of constellations concerning the home network and the visited network. In e.g. a handover scenario, all the nodes and functions will be situated in the home network. In the handover case there is no need for an AAA proxy 131.

Figure 2:
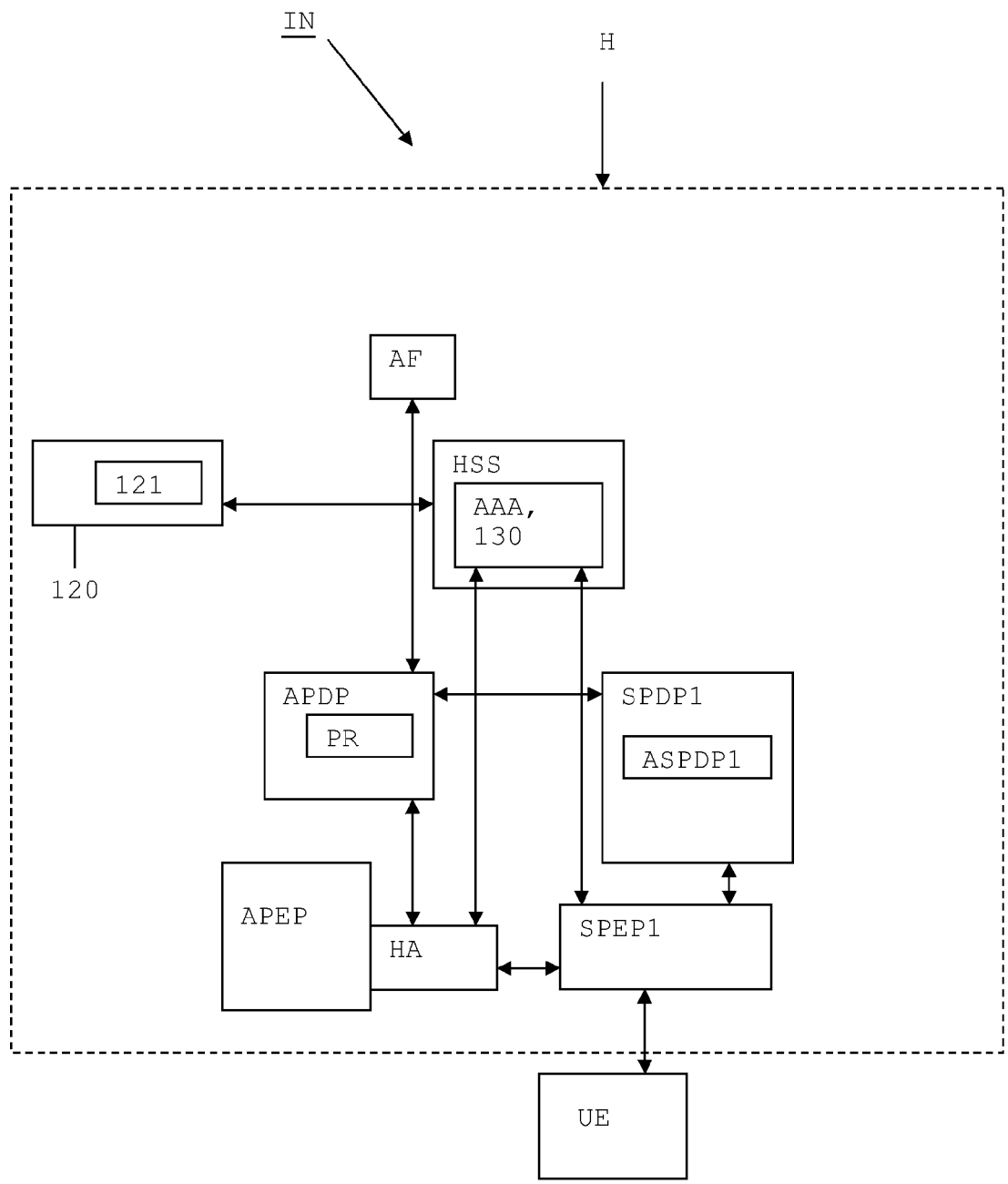
FIG. 2 is a block diagram to illustrate one embodiment of the invention in a handover scenario.

A second embodiment describes a handover scenario according to FIG. 2. Both the Anchor PDP, APDP, and the Serving PDP, SPDP1, is situated in a home network H. The Anchor PDP is also connected to an Application Function (AF) situated in the Home network H. The home agent HA is situated in the home network H and the user equipment is connecting to a Policy Enforcement Point, SPEP1 also situated in the home network. There is no AAA proxy needed in this case. The method comprises the following steps.

The user equipment UE attaches to a new access in the home network.

Run an access authentication procedure.

Assign an home agent(HA)

Run DHCP discovery for assignment of the local IP address to the UE.

Configure the UE with the address (ASPDP1) of the SPDP depending on the assigned IP address.

IP session request is send to S-PDP

Run IP security between UE and the AAA server, assign an home agent PoP (HA) and include the HA in the successful response of the IP security.

HA assigns a home IP-address of the UE and an anchor policy decision point APDP.

APEP, including the HA, sends IP session setup to the APDP.

UE starts MIP binding update or registration request to the HA including the S-PDP address.

HA sends update request to A-PDP including the S-PDP address.

The APDP creates a default PCC rule after interaction with the subscriber database 120, initiates a PDP-PDP interface to push rules to the SPDP1.

Figure 3:
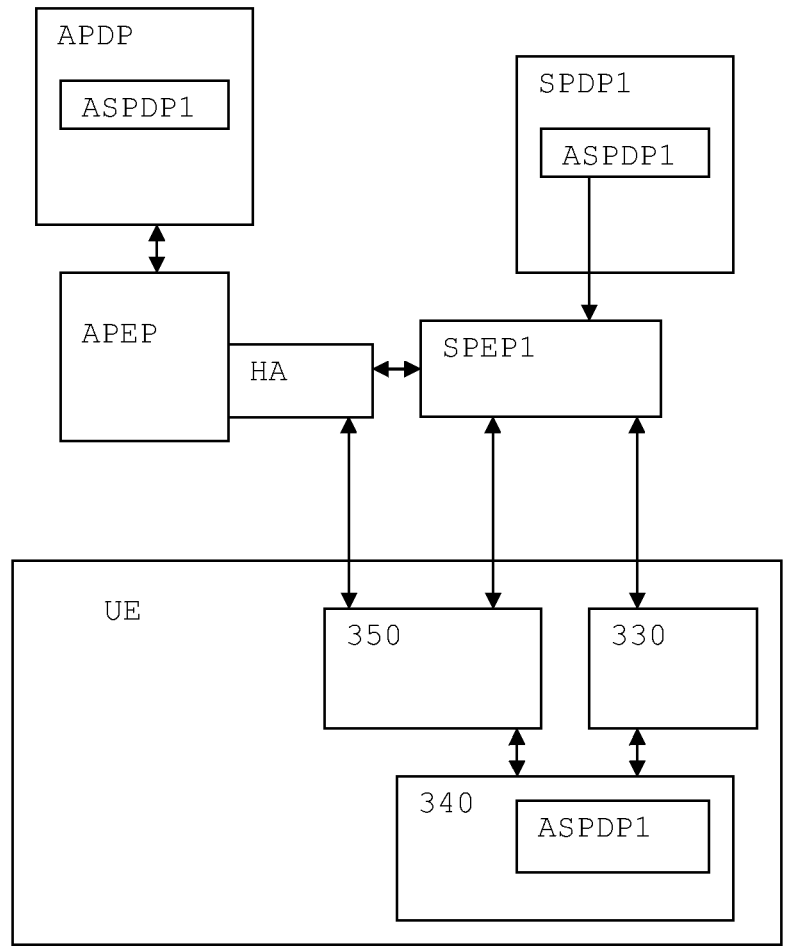
FIG. 3 is a block diagram to illustrate one embodiment of an user equipment.

The SPDP1 push rules after possible modification to the SPEP1. The session ID can be used to bind local IP address and the home IP address in APDP FIG. 3 illustrates an user equipment (UE) used in the methods described above. It comprises means 330 for receiving the address ASPDP1 of the serving Policy Decision Point SPDP1 associated to the user equipment UE, means 340 for storing an address ASPDP1 of the serving Policy Decision Point and means 350 for sending the address of the serving policy Decision Point to the Home Agent so that the Home Agent can forward the address of the serving policy decision point to the anchor Policy Decision Point.

The invention claimed is:

1. A method in a user equipment, suitable for Policy Decision Point discovery in a roaming or handover scenario in an IP network (IN), the method comprising:

receiving at a user equipment an address of a serving Policy Decision Point;

sending to a Home Agent a registration request comprising a local IP address of the user equipment so that the home agent can register the local IP address of the user equipment, the registration request comprising the address of the serving Policy Decision Point, and wherein the registration request is a request message according to MIPv4 standard or a binding update message according to MIPv6 standard;

forwarding the address of the serving Policy Decision Point from the Home Agent to an anchor Policy Decision Point, wherein said anchor Policy Decision Point has access to policy rules and a subscriber database comprising policy information related to the user equipment; and the anchor Policy Decision Point contacting the serving Policy Decision Point by using said address of the serving Policy Decision Point;

wherein the IP network comprises a plurality of Policy Enforcement Points, including the serving Policy Enforcement Point associated with the user equipment; and wherein the IP network further comprises a plurality of Policy Decision Points including the serving Policy Decision Point associated with the user equipment and the serving Policy Enforcement Point.

2. A user equipment connectable to an IP network (IN), which is assigned a local IP address and a home IP address, the user equipment is associated to a home agent (HA), to a serving Policy Decision Point and to an anchor Policy Decision Point, where said anchor Policy Decision Point has access to both Policy Rules and a subscriber database comprising policy information related to the user equipment, the user equipment comprising:

means for receiving the address of the serving Policy Decision Point;

means for storing address of the serving Policy Decision Point, means for sending to the Home Agent a registration request comprising the local IP address of the user equipment so that the home agent can register the local IP address of the user equipment characterized in that the registration request comprises the address of the serving Policy Decision Point associated to the user, and where the registration request is a request message according to MIPv4 standard or a binding update message according to MIPv6 standard, wherein the Home Agent forwards the address of the serving Policy Decision Point to the anchor Policy Decision Point, wherein said anchor Policy Decision Point has access to policy rules and a subscriber database comprising policy information related to the user equipment: and wherein the anchor Policy Decision Point contacts the serving Policy Decision Point by using said address of the serving Policy Decision Point;

wherein the IP network comprises a plurality of Policy Enforcement Points, including the serving Policy Enforcement Point associated with the user equipment; and wherein the IP network further comprises a plurality of Policy Decision Points including the serving Policy Decision Point associated with the user equipment and the serving Policy Enforcement Point.

* * * * *